Dec. 2, 1952     C. C. SCHWEISO     2,620,086
PRESSURE COOKER RELIEF VALVE
Filed May 3, 1948     3 Sheets-Sheet 1

INVENTOR
CLIFFORD C. SCHWEISO
BY William C. Babcock
ATTY.

Dec. 2, 1952 C. C. SCHWEISO 2,620,086
PRESSURE COOKER RELIEF VALVE
Filed May 3, 1948 3 Sheets-Sheet 2

INVENTOR
CLIFFORD C SCHWEISO
BY William C. Babcock
ATTY.

Dec. 2, 1952  C. C. SCHWEISO  2,620,086
PRESSURE COOKER RELIEF VALVE
Filed May 3, 1948  3 Sheets-Sheet 3

INVENTOR
CLIFFORD C. SCHWEISO
BY William C. Babcock
ATTY.

Patented Dec. 2, 1952

2,620,086

UNITED STATES PATENT OFFICE 2,620,086

PRESSURE COOKER RELIEF VALVE

Clifford C. Schweiso, Minneapolis, Minn., assignor to General Mills, Inc., a corporation of Delaware Application May 3, 1948, Serial No. 24,763

5 Claims. (Cl. 220—44)

This invention relates to pressure cookers, and, more specifically, to an improved form of construction for the pressure relief mechanism. This application is a continuation in part of my abandoned application, Serial No. 715,087, filed December 9, 1946, for Pressure Cooker Relief Valve.

In various prior art cookers, the construction of the pressure relief mechanism has been unsatisfactory. For one thing, the valve seats have been subject to wear and have been difficult to replace after the seat has worn away to a point where the valve operation was no longer satisfactory. Also, in those types of pressure relief mechanism which make use of a pressure weight, there has been a tendency for the weight to wobble on the valve seat with a resulting increase in wear and decrease in effectiveness of closing of the valve.

Another disadvantage of many prior art constructions is that the pressure relief passage in the interior of the cooker can be easily blocked by a particle of the food being cooked, so that the valve will no longer operate to relieve excessive pressure. Again, in some of the prior forms, the steam outlet of the pressure relief mechanism has been so arranged that it was easy for the steam to burn the hands of the user unless great care were exercised.

With these disadvantages and defects of the prior art mechanism in view, it is accordingly one object of the present invention to provide an improved form of construction for a pressure cooker.

Another object is the provision of a pressure relief means which is not readily subject to blocking by food particles.

Still another object is to provide a combination cover-retaining member and valve seat which can be easily manufactured and readily replaced when the valve seat has become worn.

Another object is the provision of a pressure control means with a low center of gravity and with baffles to deflect the escaping steam.

A further object of the invention is to provide a combination pressure gauge and relief valve of improved design which can be produced readily with molded body parts and can be assembled conveniently during production.

A still further object is the provision of a combination gauge and valve especially adapted to cooperate with the cover-supporting crossbar of a pressure cooker.

Other objects and advantages of this invention will be apparent from the following specification and the attached drawings.

With reference to these drawings, wherein like reference characters indicate like parts, Figure 1 is a side elevation of a pressure cooker which incorporates one embodiment of my invention, certain parts of the cooker being broken away for the sake of clarity;

Figure 1:
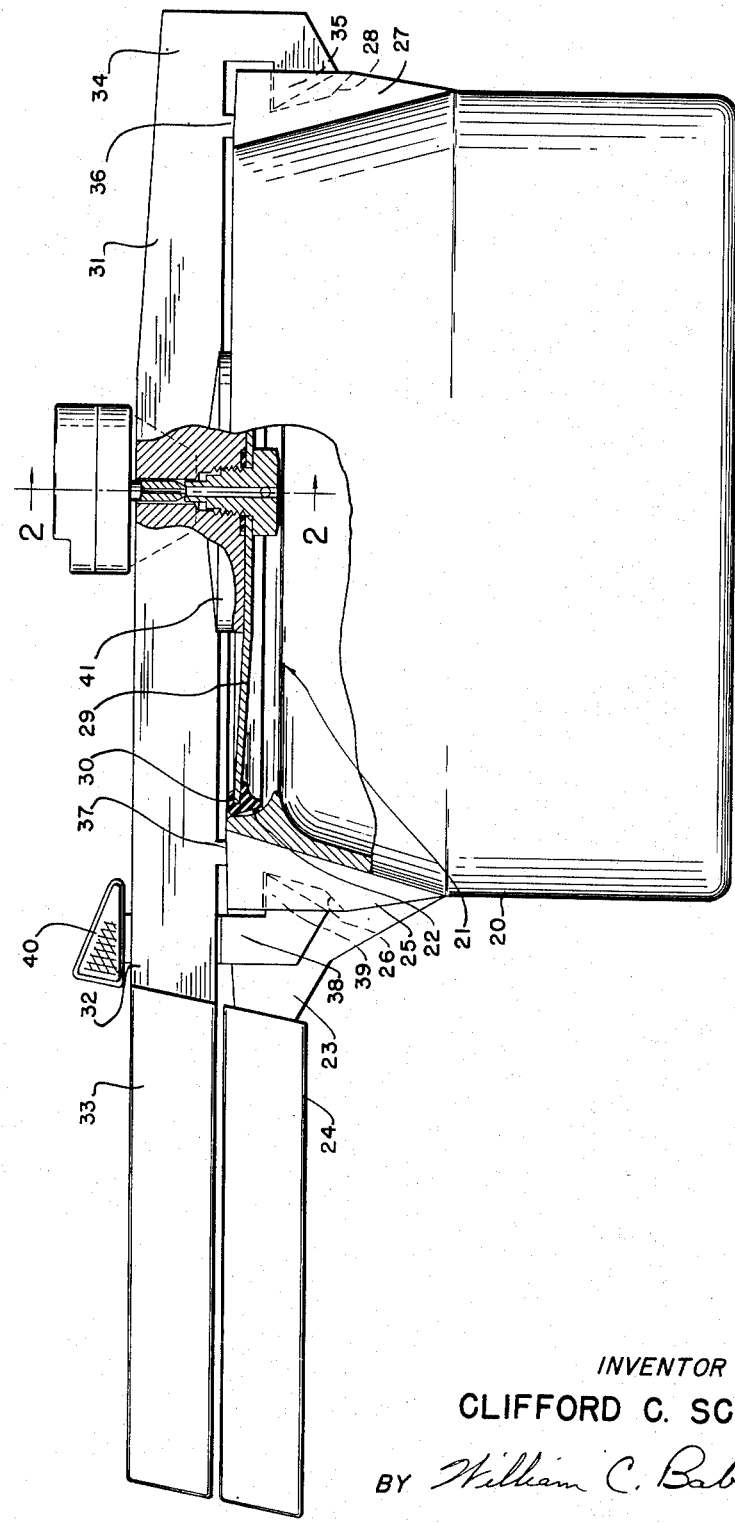

The pressure cooker, in connection with this invention, may have any desired form of construction, subject to the limitations hereinafter pointed out. By way of example, I have shown in Fig. 1 a cooker which comprises a pot or body member 20 provided with a circular opening 21 at its top. Around the edges of this circular opening 21, there is a curved annular seat 22 for cooperating with the cover, to be described below. At one side of the pot there is a handle extension 23 which may be cast as an integral part of the pot or may be made separately and fastened to the pot by riveting, welding, or other known means. On this handle extension 23 is mounted a suitable handgrip 24, preferably made of heat-insulating plastic material. The portion of the pot 20 immediately adjacent the handle extension 23 is enlarged or thickened as at 25, and this thickened portion is provided on each side of the handle extension with a suitable notch or recess 26 in which a latch member, to be described below, can be engaged.

Diametrically opposite the handle extension, pot 20 is provided with another thickened section 27, which, in turn, has a locking recess 28 in which a hooked portion of the cover-retaining means can be engaged.

The cover 29 may be made of any suitable material and design known in the pressure cooker field, and it is provided at its edge with a suitable gasket 30 made of synthetic rubber or other resilient material which will withstand the temperature and other conditions of the cooking operation. This cover 29 is fastened to a cover support or bridge 31 in a manner which will be described in greater detail below. The support or bridge 31 extends substantially diametrically across the pot 20 above opening 21 and one end 32 of the bridge extends beyond the pot parallel to handle extension 23 of the pot in order to constitute a suitable support for a plastic or other handgrip 33, by which the crossbar and cover can be lifted for engagement with, or disengagement from, the pot, itself. At the other end of the support 31 there is a downward projection 34 provided with an inwardly directed latching hook 35. This hook 35 is adapted to engage recess 28 previously described and serves to hold this end of bridge 31 in position on the pot. A suitable positioning lug 36 is also provided at this end of the bridge in order to cooperate with hook 35 to position the bridge and lock it in place.

A similar lug 37 is formed at the other end of bridge 31 adjacent handle extension 32. It will be apparent that lugs 36 and 37 limit the downward movement of the bridge toward the pot at whatever point serves best to achieve the necessary sealing action of the particular cover which is used.

Also mounted at this end of bridge 31 is a suitable latch member 38 of any desired construction. Details of the latch construction are not shown in the drawing. However, this particular latch is slidable along the line of the bridge or crossbar 31 and operates in a suitable slot in the bridge. Said latch includes two downwardly projecting latching hooks 39, one on each side of handle extension 23. These latching hooks 39 engage the locking recesses 26 previously described. Spring means may be provided to urge the latch into its locking position as shown in Fig. 1. Also, a suitable thumb button 40 may be mounted at the upper end of latch 38 where it can be readily manipulated by the user, when it is desired to open the latch and remove the cover.

Figure 2:
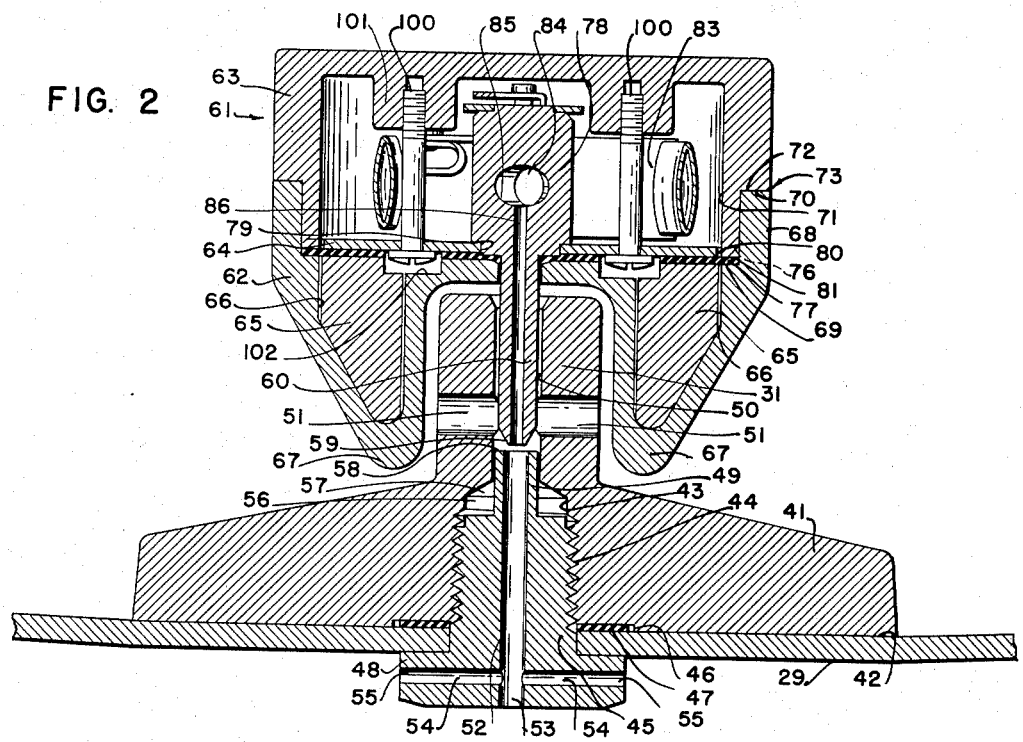
Fig. 2 is an enlarged sectional view on the line 2—2 of Fig. 1.
Figure 3:
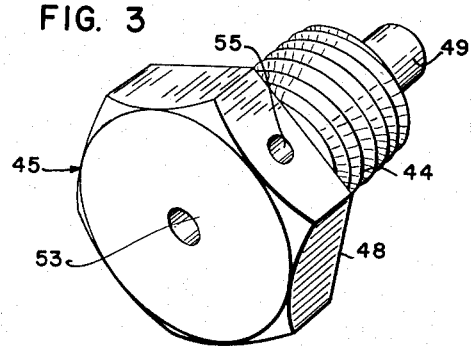
Fig. 3 is an enlarged perspective view of the cover fastening member used in the embodiment of the preceding figures.

With reference to the mounting of cover 29, I have provided a suitable enlarged portion 41 formed as an integral part of crossbar 31. This enlarged portion of the crossbar may be of any desired size or shape which is adapted to form a suitable backing or support for the cover itself. This portion 41 has a flat circular surface 42 in the plane of the opening 21 and cover 29 is fastened firmly against this flat circular surface 42 by an attaching member 45. As shown in Fig. 2, the bridge 31 and reinforcing extension 41 are provided with a cylindrical recess 43 at the center of the cover. Recess 43 may be internally threaded for engagement by the threaded portion 44 of attaching member 45. As shown, member 45 is a threaded bolt.

The edges of portion 41 immediately adjacent the threaded recess 43 may be cut back or countersunk, as shown at 46, in order to accommodate a suitable packing ring 47. This packing ring will fit tightly between portion 41 and the cover, and will serve to prevent escape of steam at this joint where the cover is attached to the support 41.

Bolt 45 has a suitable head 48 of greater diameter than the body of the bolt. It will be seen from the drawing that the cover is firmly held against flat circular face 42 of reinforcing portion 41 by this headed portion 48 of bolt 45.

At its inner end bolt 45 has a cylindrical extension 49 of smaller diameter than the threaded portion 44. This extension 49 is adapted to project into the passage 50 of circular cross-section which extends vertically upward through crossbar 31 from the center of recess 43. Just above the upper end of extension 49, bridge 31 is provided with lateral ducts, passages 51, which intersect the vertical passage 50 and connect it with the atmosphere for relief of excessive internal pressure.

In order that the interior of the cooker may communicate with these pressure relief ducts 51, bolt 45 has been provided with an axial passage 52 which opens at the center of the head of the bolt, as at 53, to the interior of the cooker. Inasmuch as opening 53 might well be blocked by particles of food within the cooker, I have provided one or more additional passages 54 which are connected to the central bore 52 and which open into the interior of the cooker at points 55, spaced a substantial distance from the axial opening 53. In the form shown, these passages 54 are radial, but it will be apparent that they could extend in any other suitable direction which would accomplish the main purpose, which is to provide a plurality of openings on the inside of the cooker, all of which communicate with the upper end of axial duct 52, and ultimately with the pressure relief passages 51.

The recess 43, as shown in Fig. 2, has a greater depth than the thick or threaded portion 44 of bolt 45. This leaves a space 56 which will allow for variations in the thickness of cover 29 or manufacturing variations in the length of the threaded portion. Between this cylindrical portion 43, surrounding space 56, and the narrow, vertical passage 50, the wall has been formed with a conical surface 57.

Passage 52 in the bolt 45 opens into the narrow, vertical passageway 50 and forms a circular valve seat 58 at the upper end of the bolt. This valve seat is adapted to cooperate with a sloping or conical valve surface 59 on the vertical downwardly extending stem 60 of the pressure control member 61. I have shown this member in the form of a combination pressure gauge and weight. It will be apparent that an increase of internal pressure within the cooker will tend to lift the stem 60 and pressure member 61 away from valve seat 58 and will permit the escape of steam through the lateral passages 51.

The details of construction of the combined gauge and pressure weight will now be described.

The combined gauge and pressure weight 61 includes an outer housing made of two inter-fitting sections 62 and 63 made of plastic or other suitable material. As shown, section 62 is the lower member of the housing while section 63 forms the upper enclosure thereof. Between these housing members 62 and 63 is clamped a metal mounting plate 64 which carries a suitable gauge mechanism of known construction.

The lower housing member 62 has two downwardly extending portions 67, one on each side of crossbar 31. As shown in Fig. 2, these extensions or projections 67 form side flanges which conceal the outer ends of relief openings 51 and also serve to deflect steam passing from these openings so that such steam is baffled and cannot issue in a high speed jet which would burn the hands. In the construction shown, these downward flanges 67 are hollowed out, as at 66, to accommodate suitable lead weights 65 which are adapted to give the necessary weight to the entire gauge construction, so that the gauge with its stem 60 and conical valve 59 will close the valve seat 58 until the pressure within the cooker reaches a predetermined value.

With reference to the details of the joint between upper and lower housing members 62 and 63, it will be seen that the lower member has an upwardly extending outer flange 68 which leaves a flat supporting surface 69 for the metal supporting plate 64 previously mentioned. Upper housing member 63 has a downwardly extending flange 71 which fits inside the flange 68 of the lower member, as shown. The upper end 70 of outer flange 68 is flattened, as shown, to cooperate with a corresponding shoulder 72 on the upper housing member 63, in order to form a smooth joint at 73.

Figure 5:
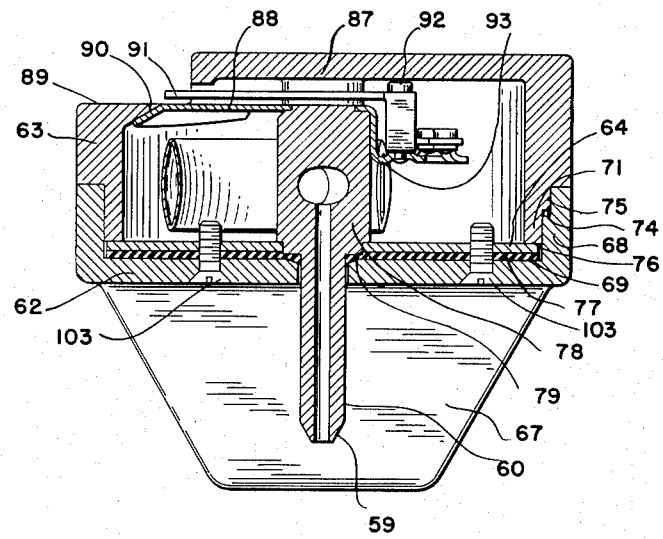
Fig. 5 is a sectional view along the line 5—5 of Fig. 4.

In order to prevent relative rotation between members 62 and 63, I have provided a locking notch 74 (as shown in Fig. 5) at one point along the inner periphery of flange 68. A corresponding lug 75 projects from flange 71 and is mated with the notch in assembly, in order to lock the two housing members together in their predetermined relative positions. The inner downwardly extending flange 71 of upper housing member 63 terminates in a flat, annular surface 76 which is spaced from the flat supporting surface 69 of lower member 62 just sufficiently to accommodate the metal mounting plate 64, together with a suitable sealing gasket 77. This gasket may be made of synthetic rubber or equivalent material. The resilient gasket allows a reasonable manufacturing tolerance in the molding of parts 62 and 63, and when compressed, it helps hold plate 64 firmly in place.

The metal mounting plate 64 is firmly joined to the main body portion 78 which is shown as a cylindrical hub. This hub 78 has a cut away portion as at 79, on which the metal mounting plate 64 is fastened by sweating, staking, or other known means. As shown in Figs. 2 and 5, hub 78 is integral with stem 60, previously described.

In order to hold the metal mounting plate 64 and hub 78 without rotation within the gauge, I have provided two notches 80, best shown in Fig. 2, which cooperate with downwardly extending lugs 81 on flange 71 of upper housing member 63. It will be seen that when plate 64 is placed against flange 71, with notches 80 in engagement with these lugs 81, relative rotation of these parts will be impossible.

Hub 78 is provided with an integral lateral extension 82 to the outer end of which is fastened one end 83 of a standard Bourdon tube. This extension 82 has a passageway 84 which communicates at one end with the Bourdon tube and at the other end with a hollow recess 85 in the hub 78. An axial passage 86 through stem 60 and hub 78 in turn communicates with the central recess 85. Thus, it will be obvious that when the stem 60 with its valve 59 is resting on valve seat 58, there will be a continuously open passage from the interior of the cooker through axial opening 52 of the cover-retaining nut 45, passageway 86 of stem 60, recess 85, and passageway 84, to the Bourdon tube, so that the pressure within the tube will be the same as that on the inside of the cooker. Thus, by connecting a suitable indicating mechanism to the Bourdon tube, it will be possible at all times to obtain a reading of the pressure conditions within the cooker.

Figure 4:
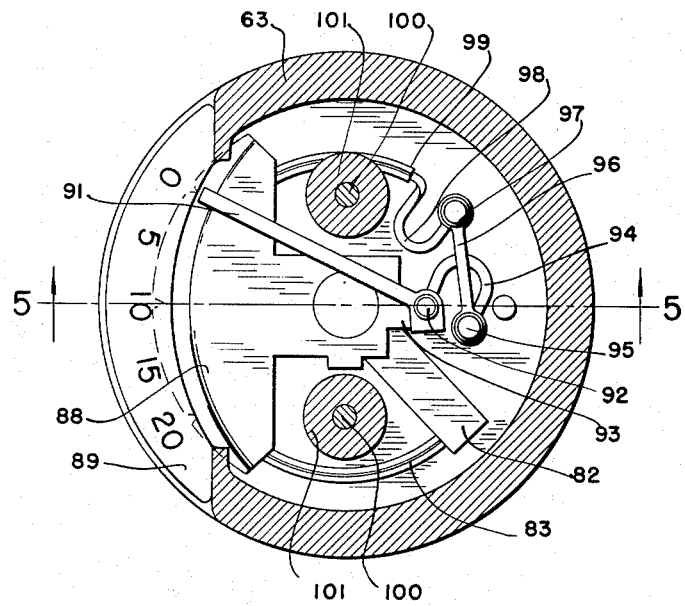
Fig. 4 is a top view of the combination pressure gauge and relief valve of Figs. 1 and 2 with the top wall of said gauge broken away to show the internal parts.

In order to mount a pointer on a suitable support, the upper end of hub 78 is cut back to form a circular shoulder at 87, as shown in Fig. 5. A plate 88 is mounted over the reduced circular portion, so formed, and is fastened securely to the hub by staking or other desired means. This plate 88 has at one end a slightly bent arcuate portion, which fits under the lower lip 89 of annular opening 90 in housing member 63. The upper surface of lip 89 is provided with a suitable scale as shown in Fig. 4. A pointer 91 is visible through opening 90 and cooperates with the scale on lip 89 to give a reading of the pressure.

Pointer 91 is pivoted on a stud 92 which is fastened to a downwardly offset step 93 of plate 88. Thus, plate 88 serves both as a partial closure for opening 90 and as a supporting member for the pointer mechanism. If desired, the scale could be formed on the arcuate portion of plate 88, where it would be visible through the opening, rather than on the outside of lip 89.

Pointer 91 is further provided with a U-shaped, bendable extension 94 next to the pivot 92. This U-shaped arm 94 moves with pointer 91 and may be an integral extension of it. The end of arm 94 is pivoted at 95 to a connecting link 96, the other end of which is pivoted at 97 to a bendable U-shaped extension 98 at the free end of Bourdon tube 99.

It will be apparent that the gauge mechanism may be adjusted by means of links 94 and 98. For example, link 98 may be bent in order to adjust the initial setting of the pointer to the zero point on the dial. Link 94, on the other end, may be bent to adjust the leverage applied to pointer 91 and thus calibrate the gauge so that the pointer will give an accurate reading for any predetermined pressure.

In order to hold the parts, previously described, in their assembled position, and in order to facilitate assembly of the gauge during manufacture, the following fastening means have been provided.

First of all, the hub 78 and plates 64 and 88 will be assembled as a unit together with the Bourdon tube, pointer and connecting links. Next, this sub-assembly will be placed in position against upper housing member 63 with lugs 81 of the flange 71 engaging the locking recesses 80 of plate 64. The parts will be held in this position by fastening screws 100, the headed portions of which engage plate 64. These screws 100 are threaded into the thickened hub portions 101 of upper housing member 63 as shown in Fig. 2. Lower members 62 and weights 65 may be recessed as at 102 in order to accommodate the heads of bolts 100.

Finally, the lead weights 65 and gasket 77 are placed in position in lower housing member 62, and this member is then fitted against upper housing member 63 with positioning lug 75 engaged in recess 74 of flange 68. The parts are held in this position by screws 103, threaded into the mounting plate 64 from below.

The assembled gauge can then be placed in position on the crossbar 31 of the cooker with stem 60 projecting vertically downward in passage 50 of the crossbar, and with the two downward lateral extensions 67 of the gauge body positioned outwardly of passages 51.

With the foregoing descriptions of parts in mind, operation of the gauge will be readily understood. Thus, when the gauge is first placed on the cooker, prior to commencement of the cooking operation, conical valve surface 59 will be held firmly against valve seat 58 of bolt member 55 by the weight of the gauge. As pressure builds up within the cooker, the amount of such pressure will be indicated at all times by pointer 91 and its cooperating scale, in view of the fact that Bourdon tube 99 is connected by the passageways, previously described, to the interior of the cooker. If the pressure within the pot exceeds the danger point for which the weight of the valve has been designed, then the upward force, due to such pressure, will be sufficient to lift the gauge and valve 61 away from the valve seat, as shown in Fig. 2. In this position, the excess pressure can be relieved by means of passageways 51.

It should be noted that in addition to the deflection of steam issuing from passages 51, the side flanges 67 of the gauge housing also permit positioning of the lead weights 65 at a fairly low point, with reference to the valve surface 59. This arrangement will increase the stability of the valve member and will tend to prevent wobbling of the gauge and valve with resultant leakage. Stability of the gauge is further enhanced by the relatively close sliding fit of stem 60 in passage 51. Thus, the walls of passage 51 prevent substantial tilting or lateral movement of stem 60 and insure good contact between the valve and seat.

Finally, should the valve seat 58 become worn or nicked in the course of time, it will be a simple matter to replace fastening member 45 and thus provide a new and perfect valve seat without the difficulty and expense of re-machining any part of crossbar 31 or cover reinforcement 41. Thus, it will be apparent that I have provided an improved form of construction for a combination gauge and relief valve for pressure cookers, in which the valve is relatively stable, the escaping steam is baffled to avoid injury to the user, the valve seat is readily replaced when worn, and the passageways at the inside of the cooker are not likely to become blocked by food particles within the cooker. Various minor changes in this construction may be made without essential departure from the fundamental improvements described herein.

Now, therefore, I claim:

1. In a pressure cooker having a body, a cover, and a substantially horizontal cover-supporting crossbar having intersecting vertical and lateral passages therethrough, the improvement comprising a bolt passing through said cover and engaging the lower portion of said vertical passage, said bolt clamping the cover in direct engagement against the bottom of said crossbar, and said bolt having a duct connecting the interior of said cooker to said vertical passage and also having an upwardly facing valve seat thereon at a point within the vertical passage below the lateral passage, and a pressure control member above said cross-bar having a valve stem extending down through said vertical passage to engage said seat and constitute the sole vertical support for said member, said member also having protective flanges extending downwardly on each side of said cross-bar opposite the ends of said lateral passage for deflection of steam escaping through said lateral passage.

2. In a pressure vessel of the type having a body provided with an opening, a cover for the opening and a substantially horizontal cover-supporting crossbar member removably mounted on the body across the opening and having an upper surface and a substantially vertical internally threaded pressure relief passage extending downwardly therefrom, the improvement comprising a threaded bolt passing through the cover and part way into the relief passage and having a head below the cover engaging and fastening the cover rigidly against the supporting member, the cover being clamped in direct engagement between said head and crossbar, the bolt having a duct therethrough connecting the interior of the cooker and the relief passage and also having an upwardly facing valve seat at the end of the bolt within the passage in said supporting member and spaced below said upper surface, and a pressure control valve having a stem vertically slidable in the passage and a valve portion at the bottom of the stem engaging the seat and providing the sole vertical support for said stem and valve and automatically opening and closing the duct at said seat by vertical movement of the stem and valve in response to predetermined pressures within the body and duct.

3. A pressure vessel according to claim 2 in which the supporting member has a pair of lateral openings in opposite sides of the member and communicating with the passage above the seat, and the control valve has a body portion above the stem and support member and also has a pair of depending flanges extending downwardly alongside the crossbar member and opposite said openings.

4. In a pressure vessel of the type having a body provided with an opening, a cover for the opening, and a substantially horizontal cover-supporting crossbar removably mounted on the body and extending across the opening and having an upper surface and a substantially vertical pressure relief passage extending downwardly inside the crossbar from said upper surface and communicating with the interior of the vessel, the improvement comprising an upwardly facing valve seat in said passage below the upper surface of the crossbar, the crossbar having one side provided with a lateral discharge opening intersecting the passage above the seat, and a pressure control weight removably mounted above the crossbar and having a valve stem vertically slidable in said passage above the seat, and a valve at the lower end of said stem engaging the seat and thereby providing the sole vertical support for the weight and also controlling the relief of pressure through said passage and opening, said pressure control weight having a flange extending downwardly across the side of the crossbar in front of said opening and spaced slightly therefrom thereby deflecting any steam escaping through said opening and preventing substantial rotation of the weight around the axis of said stem and passage.

5. In a pressure vessel of the type having a body provided with an opening, a cover for the opening and a supporting member for the cover removably mounted on the body and having a substantially vertical internally threaded pressure relief passage therein, the improvement comprising a threaded bolt passing through the cover and part way into the relief passage and having a head below the cover engaging and fastening the cover rigidly against the supporting member, the bolt having a duct therethrough connecting the interior of the cooker and the relief passage and also having a valve seat at the end of the bolt within the passage in said supporting member, and a pressure control valve having a stem in the passage and a valve portion engaging the seat and closing the duct, said supporting member having a pair of lateral openings in opposite sides of the member and communicating with the passage above the seat, and the control valve having a body portion above the stem and support member and also having a pair of depending hollow flanges extending downwardly alongside the support and opposite said openings, said hollow flanges having weights therein.

CLIFFORD C. SCHWEISO.

REFERENCES CITED

The following references are of record in the file of this patent:

UNITED STATES PATENTS

| Number | Name | Date |
|---|---|---|
| 1,499,461 | Kruppa | July 1, 1924 |
| 1,823,595 | Ducroux | Sept. 15, 1931 |
| 2,200,903 | Stephens | May 14, 1940 |
| 2,282,011 | Vischer, Jr. | May 5, 1942 |

FOREIGN PATENTS

| Number | Country | Date |
|---|---|---|
| 44,906 | Austria | Nov. 10, 1910 |
| 652,756 | France | Oct. 29, 1928 |